W. A. LEWIS.
WAGON AXLE.
No. 108,607. Patented Oct. 25, 1870.
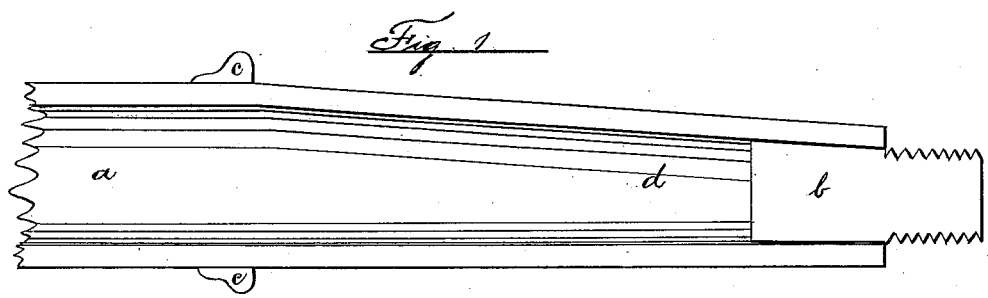
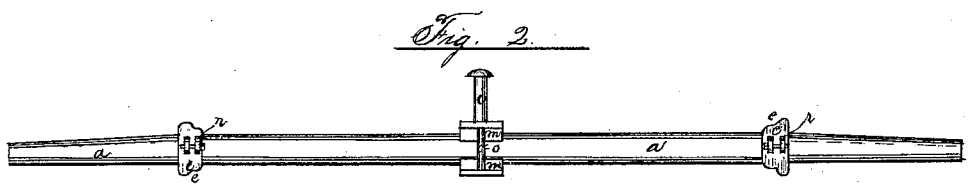
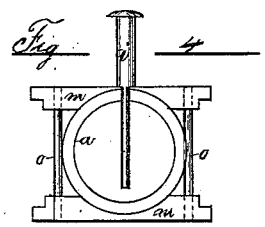 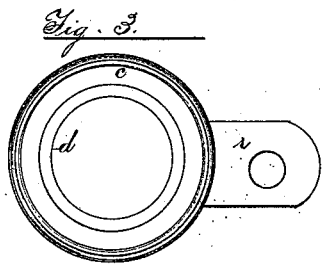
Witnesses
Thos. H. Hutchins
Hervey Lowe
Inventor
William A. Lewis

UNITED STATES PATENT OFFICE.

WILLIAM A. LEWIS, OF JOLIET, ILLINOIS.

IMPROVEMENT IN WAGON-AXLES.

Specification forming part of Letters Patent No. 108,607, dated October 25, 1870.

*To all whom it may concern:*

Be it known that I, WILLIAM A. LEWIS, of the city of Joliet, in Will county, and State of Illinois, have invented certain new and useful Improvements on a Wagon-Axle; and I do hereby declare the following to be a full, clear, and exact description of the same, reference being had to the annexed drawings, in which—

Figure 1 is a longitudinal sectional view of the spindle and part of the axle; Fig. 2, a perspective view of the axle; Fig. 3, a cross-sectional view of the axle at the inner end of the spindle $d$, and Fig. 4 a cross-sectional view of the king-bolt and clip at the center of the axle.

The first improvement I claim to have made is in the use of a pipe or hollow tube, $a$, having the ends swaged to a taper to form the spindle $d$ of itself, without the use of skeins or other external additions as bearings for the boxes to wear on, as shown in Fig. 1. I case-harden the spindle $d$, so as to make it hard, that it may wear a long time. The wrought-iron collar $c$ is shrunk on to form a shoulder for the hub to run against.

Another improvement I claim to have made is in the king-bolt clip, and the arrangement of the bolt at the center of the axle. The king-bolt $i$ passes through the clip $m$, which is held in place by the bolts $o$. The upper part of the clip furnishes a seat for the end of the reach, and the whole arrangement strengthens the axle at the center, as it is not necessary to have a hole entirely through the axle at that point, as is shown in Fig. 4. The collars $c$ are furnished with the hinges $r$ for the thills, thus saving another set of thill-clips.

$b$ is a plug, welded into the ends of the axles, for the nut to screw on which holds the wheels.

Having thus described my invention, what I claim as new, and desire to secure by Letters Patent, is as follows:

1. The hollow-tapered case-hardened spindle $d$, formed on the axle $a$, and being a prolongation of the hollow axle $a$, so as to dispense with a separate skein, as described and shown.

2. The combination of the clip $m$, bolts $o$, king-bolt $i$, and axle $a$, constructed and arranged substantially as and for the purposes set forth.

3. The combination of the collar $c$, hinge $r$, and axle $a$, constructed and arranged as and for the purposes set forth.

WILLIAM A. LEWIS.

Witnesses:
 THOS. H. HUTCHINS,
 HERVY LOWE.